T. LOUDEN.
SANITARY DRINKING BOWL FOR STOCK.
APPLICATION FILED APR. 9, 1914.
1,227,279.
Patented May 22, 1917.
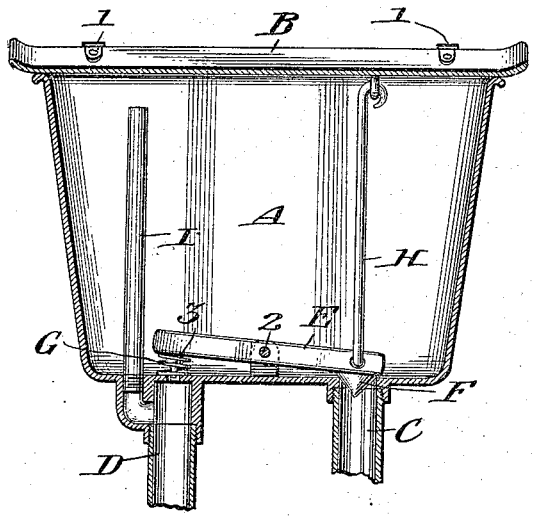
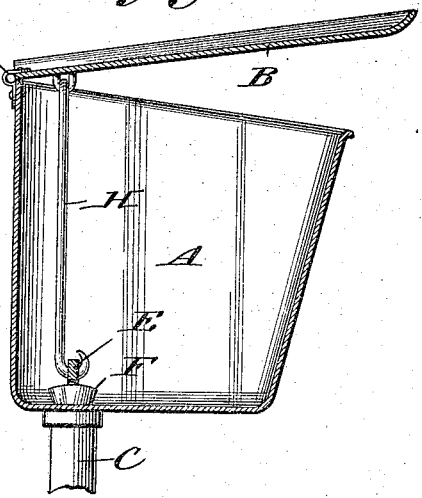
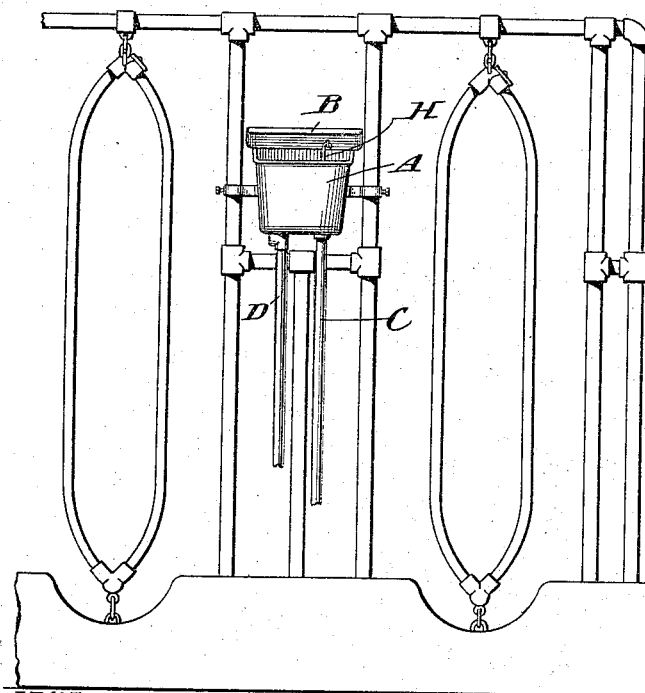
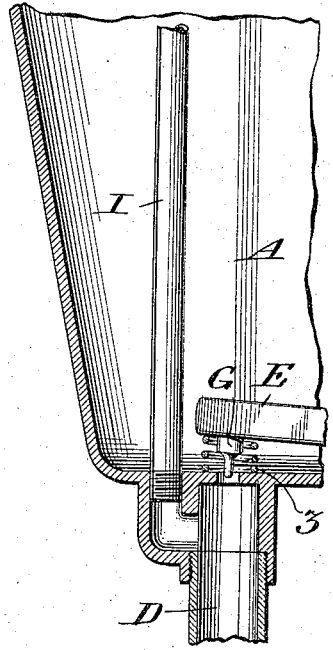
Witnesses:
Frank A. Borden
H. F. Rueth
Inventor:
Thomas Louden
By Vernon E. Hodges
his Atty.

UNITED STATES PATENT OFFICE.

THOMAS LOUDEN, OF FAIRFIELD, IOWA.

SANITARY DRINKING-BOWL FOR STOCK.

1,227,279.  Specification of Letters Patent.  Patented May 22, 1917.

Application filed April 9, 1914. Serial No. 830,832.

*To all whom it may concern:*

Be it known that I, THOMAS LOUDEN, a citizen of the United States, residing at Fairfield, in the county of Jefferson and State of Iowa, have invented certain new and useful Improvements in Sanitary Drinking-Bowls for Stock, of which the following is a specification.

My invention relates to an improvement in sanitary drinking-bowls for stock, the object being to provide a self-closing bowl capable of being opened by the animal wanting a drink, it being so constructed that it automatically cuts off the water supply under normal conditions and causes a flow of water into the bowl when the animal is drinking, as well as the complete draining of the bowl when not in use.

With the foregoing objects in view, my invention comprises a bowl adapted to be fastened in convenient position for access thereto, with inlet and outlet valves both located within the bowl, and a cover hinged to one of the upper edges of the bowl so as to stand in a normally closed position, and having connection with the valves, whereby the movements of the cover in being opened and in closing will alternately open and close the valves. It further consists of other features hereinafter set forth and definitely defined in the claims.

In the accompanying drawings:—

Figures 1 and 2 are sectional views at right-angles to each other;

Fig. 3 is a view showing a common application of the drinking-bowl between two stalls; and Fig. 4 is a detail.

A, represents the bowl preferably made of cast-iron in any approved shape, as for instance that illustrated; B, is a cover or lid hinged at one edge to an upper edge of the bowl, as at 1; C, indicates the water-inlet pipe for supplying the bowl; and D, is the outlet-pipe for draining the water therefrom. The free edge of the lid B is extended beyond the edge of the bowl to entirely cover it and to enable an animal to lift the lid with its nose.

E, indicates a lever fulcrumed at 2, and having a valve F at one end for opening the inlet-pipe C, and a valve G at the other end for closing the outlet-pipe D. A spring 3 surrounds the latter valve G, it being interposed between the lever and the bottom of the bowl where it normally forces the end of the lever upward, beneath which it is placed, to allow any water in the bowl to escape through outlet-pipe D, and serving as a strainer to catch any particles which would tend to clog the outlet, while holding the opposite end of the lever E down and closing the valve F securely against its seat, thus shutting off the inflow of water.

In the form illustrated, the lid B is connected by a rod H to the end of the lever E having the valve F, whereby this end of the lever will be raised when the lid is lifted on its hinges 1. This will open the inlet valve F to admit water to the bowl through the supply pipe C, and will close the outlet valve G to hold the water in the bowl.

When the lid is released it will drop of its own gravity to its closed position, which will close the inlet valve F and stop the inflow of the water, and will open the outlet valve G and let the water in the bowl pass out through the outlet D. The spring 3 will assist in this latter operation of closing the valve F, and opening the valve G, but if desired, the spring may be discarded and the gravity of the lid be depended on to accomplish this result.

To get a drink, the animal raises the cover B with its nose, which operation opens the inlet valve F and admits the water which is supplied through the pipe C in any suitable manner, and at the same time, the outlet valve G is closed to hold the water in the bowl while the animal is drinking. When the animal removes its nose from the bowl, the cover drops to its normal position which closes the inlet valve and shuts off the inflow of the water while it opens the outlet valve to let the surplus water drain off, the valves being assisted in their operations by the spring 3.

An overflow member which may be a pipe I is in communication with the outlet D so that in case the animal holds the valve F open without drinking as fast as water is supplied, it will overflow into the top of pipe I and out through outlet-pipe D before overflowing the edges of the bowl.

While it is evident the bowl may be placed in any chosen position, in Fig. 3 I have shown it attached to the stall posts between two stanchions in a cow-barn.

The valves G and F are both located within the bowl, and preferably, in an open portion thereof, instead of one or both of them being located outside of the bowl, or in a compartment or compartments connected therewith.

Constructed in this way, all parts of the bowl can be easily reached and cleaned. Consequently the places where dirt and debris can collect and be difficult to remove are reduced to a minimum, and the bowl will be easily kept in a strictly sanitary condition. All that is necessary to clean it, is to open the cover and let in some water, at the same time scrubbing it with a brush or broom, and then let the cover drop, when all the water in the bowl will drain off through the outlet valve.

More or less slight changes may be resorted to in the form and arrangement of the several parts described without departure from the spirit and scope of my invention, and hence I do not wish to be limited to the exact construction herein set forth, but:—

I claim:

1. A sanitary drinking bowl having a hinged lid extended beyond the edge of the bowl to enable an animal to lift it with its nose, an inlet valve and an outlet valve, both located on the bottom of the bowl, and a connection between the valves and the lid, whereby the opening of the lid will open the inlet valve and close the outlet valve, and the closing of the lid will close the inlet valve and open the outlet valve.

2. A sanitary drinking bowl having a hinged lid extended beyond the edge of the bowl to enable an animal to lift it with its nose, an inlet valve and an outlet valve, both located within the bowl and near the bottom thereof, and a connection between the valves and the lid, whereby the opening of the lid will open the inlet valve and close the outlet valve, and the closing of the lid will close the inlet valve and open the outlet valve.

3. A sanitary drinking bowl having a hinged lid extended beyond one edge of the bowl, inlet and outlet conduit pipes attached to the bottom of the bowl valves to open and close said conduit pipes, and a connection between the lid and the valves, whereby the opening of the lid will open the valve of the inlet pipe and close the valve of the outlet pipe, and the closing of the lid will close the valve of the inlet pipe and open the valve of the outlet pipe.

4. A sanitary drinking bowl having a hinged cover, an inlet, an outlet, valves therefor, a lever connecting the valves, and means extending to the cover, from the connection between the valves, whereby, when the cover is moved, one valve is opened and the other is closed.

5. The combination with a bowl, a cover hinged thereto, inlet and outlet-pipes, valve-seats at the upper ends thereof, a lever pivoted within the bowl and carrying valves, one for each valve-seat, a spring for actuating the lever, and a rod extending from the lever to the cover, whereby as the cover is moved the valves are controlled.

6. The combination with a drinking-bowl having inlet and outlet-pipes, valve-seats for each of said pipes, and a lever carrying a valve for each valve-seat, a spring interposed between the lever and the bowl and surrounding one of the valve-seats, whereby to hold the lever in one direction and acting as a strainer above the valve-seat, a hinged cover, and means extending from the cover to the lever, whereby as the cover is moved, the lever is operated.

In testimony whereof I affix my signature, in the presence of two witnesses.

THOMAS LOUDEN.

Witnesses:
J. K. MOORE,
FRANK H. BORDEN.

Copies of this patent may be obtained for five cents each, by addressing the "Commissioner of Patents, Washington, D. C."